United States Patent
Nakano et al.

(10) Patent No.: US 9,620,802 B2
(45) Date of Patent: Apr. 11, 2017

(54) FUEL CELL MEMBRANE ELECTRODE ASSEMBLY AND METHOD FOR PRODUCING THE SAME, AND FUEL CELL

(71) Applicant: NITTO DENKO CORPORATION, Ibaraki-shi, Osaka (JP)

(72) Inventors: Takeshi Nakano, Osaka (JP); Koso Matsuda, Osaka (JP); Hiroyuki Nishii, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 78 days.

(21) Appl. No.: 14/428,569

(22) PCT Filed: Dec. 27, 2013

(86) PCT No.: PCT/JP2013/007686
§ 371 (c)(1),
(2) Date: Mar. 16, 2015

(87) PCT Pub. No.: WO2014/103335
PCT Pub. Date: Jul. 3, 2014

(65) Prior Publication Data
US 2015/0228995 A1   Aug. 13, 2015

(30) Foreign Application Priority Data

Dec. 28, 2012   (JP) ................................ 2012-286740

(51) Int. Cl.
*H01M 8/10* (2016.01)
*H01M 8/1023* (2016.01)
(Continued)

(52) U.S. Cl.
CPC ......... *H01M 8/1023* (2013.01); *C08F 255/02* (2013.01); *C08J 5/22* (2013.01);
(Continued)

(58) Field of Classification Search
None
See application file for complete search history.

(56) References Cited

U.S. PATENT DOCUMENTS

| | | | | |
|---|---|---|---|---|
| 4,849,311 A * | 7/1989 | Itoh | ...................... | B01D 69/142 |
| | | | | 429/317 |
| 6,379,551 B1 * | 4/2002 | Lee | ........................ | C08J 5/2243 |
| | | | | 210/638 |

(Continued)

FOREIGN PATENT DOCUMENTS

| JP | 11-135137 | 5/1999 |
|---|---|---|
| JP | 2000-331693 | 11/2000 |

(Continued)

OTHER PUBLICATIONS

Sakamoto, et al., "Study of Pt-free anode catalysts for anion exchange membrane fuel cells", Catalysis Today, vol. 164, pp. 181-185, 2011.

(Continued)

*Primary Examiner* — Patrick Ryan
*Assistant Examiner* — Wyatt McConnell
(74) *Attorney, Agent, or Firm* — Hamre, Schumann, Mueller & Larson, P.C.

(57) ABSTRACT

The membrane electrode assembly (MEA) of the present invention is a fuel cell MEA including an anion exchange membrane and a catalyst layer disposed on the surface of the membrane. In the MEA, the anion exchange membrane is an anion-conducting polymer electrolyte membrane in which a graft chain having anion conducting ability is graft-polymerized on a substrate formed of a skived film of ultra-high molecular weight polyolefin. This MEA has various superior properties for achieving an improvement in the power output of an anion exchange PEFC compared to conventional MEAs.

18 Claims, 2 Drawing Sheets

(51) Int. Cl.
  *C08J 5/22*     (2006.01)
  *C08F 255/02*   (2006.01)
  *H01M 8/1088*   (2016.01)
  *H01M 8/103*    (2016.01)
  *H01M 8/1072*   (2016.01)
  *H01M 8/1007*   (2016.01)
  *H01M 8/1018*   (2016.01)

(52) U.S. Cl.
  CPC ......... *H01M 8/103* (2013.01); *H01M 8/1007* (2016.02); *H01M 8/1072* (2013.01); *H01M 8/1088* (2013.01); *H01M 2008/1095* (2013.01); *Y02P 70/56* (2015.11)

(56) References Cited

U.S. PATENT DOCUMENTS

2009/0324920 A1* 12/2009 Takeyama ............... B29C 55/04
                                                            428/220
2010/0216050 A1* 8/2010 Matsui ............... C08G 73/1042
                                                            429/483
2014/0370417 A1  12/2014 Matsuda et al.

FOREIGN PATENT DOCUMENTS

| | | |
|---|---|---|
| JP | 2008-255351 | 10/2008 |
| JP | 2010-516853 | 5/2010 |
| JP | 2012-079619 | 4/2012 |
| WO | 2008/090351 | 7/2008 |
| WO | 2010/018370 | 2/2010 |
| WO | 2011/136296 | 11/2011 |
| WO | 2013/111583 | 8/2013 |

OTHER PUBLICATIONS

Camarillo, et al., "Melting and crystallization of UHMWPE skived film", Journal of Materials Science, vol. 42, No. 15, pp. 3212-6221, 2007.

Extended European Search Report issued in corresponding European Patent Application No. 13867501.2, Jul. 21, 2016, 6 pages.

* cited by examiner

FUEL CELL MEMBRANE ELECTRODE ASSEMBLY AND METHOD FOR PRODUCING THE SAME, AND FUEL CELL

TECHNICAL FIELD

The present invention relates to a fuel cell membrane electrode assembly including an anion exchange membrane and a catalyst layer disposed on the surface of the membrane, and a method for producing the membrane electrode assembly. The present invention also relates to a fuel cell including the membrane electrode assembly.

BACKGROUND ART

Polymer electrolyte fuel cells (PEFCs) are a type of fuel cell in which a polymer electrolyte membrane is used as an ion exchange portion. Due to their advantages such as operability at lower temperatures than the operation temperatures of other types of fuel cells and high power densities, PEFCs are highly expected to be widely used in the future. Cation exchange PEFCs using cation exchange membranes exchanging hydrogen ions have been commonly used. However, recently, anion exchange PEFCs using anion exchange membranes have been reported because, for example, they can generate electric power without using platinum catalysts which are expensive and susceptible to poisoning causing a decrease in the power output. Anion exchange PEFCs have great advantages such that liquid fuels (alkaline liquid fuels) such as alcohol and hydrazine can be used and that $CO_2$ is not produced on the principle of power generation in the case where hydrazine is used as a fuel, although hydrazine is a liquid fuel. Non-Patent Literature 1 discloses an anion exchange PEFC in which hydrazine hydrate is used as a fuel.

Patent Literature 1 discloses, as a specific example of anion exchange membranes, an anion-conducting polymer electrolyte membrane obtained by selecting a hydrocarbon polymer film, radiation-graft-polymerizing the hydrocarbon polymer film with a monomer, and adding a quaternizing agent to impart ionic conductivity (in this membrane, the monomer is presented in the form of a monomer/diluent mixture, and the diluent contains alcohol and a hydrocarbon solvent). Patent Literature 1 also describes that the hydrocarbon polymer film is selected from the group consisting of low density polyethylene (LDPE) and high density polyethylene (HDPE).

In a PEFC, an anion exchange membrane is usually used in the form of a membrane electrode assembly (MEA) in which a catalyst layer is disposed on the surface of the membrane.

CITATION LIST

Patent Literature

Patent Literature 1: JP 2010-516853 T

Non-Patent Literature

Non-Patent Literature 1: T. Sakamoto et al., "Study of Pt-free anode catalysts for anion exchange membrane fuel cells", Catalysis Today, vol. 164 (2011), pp. 181-185

SUMMARY OF INVENTION

Technical Problem

It is an object of the present invention to provide a fuel cell membrane electrode assembly (MEA) including an anion exchange membrane and having various superior properties for achieving an improvement in the performance of an anion exchange PEFC compared to conventional MEAs, and a method for producing the MEA.

Solution to Problem

The fuel cell MEA of the present invention includes: an anion exchange membrane; and a catalyst layer disposed on a surface of the anion exchange membrane. In this MEA, the anion exchange membrane is an anion-conducting polymer electrolyte membrane in which a graft chain having anion conducting ability is graft-polymerized on a substrate formed of a skived film of ultra-high molecular weight polyolefin.

The fuel cell of the present invention is a fuel cell (an anion exchange PEFC) including a MEA including an anion exchange membrane. In this fuel cell, the MEA is the fuel cell MEA of the present invention.

The method for producing a fuel cell MEA of the present invention is a method for producing the fuel cell MEA of the present invention. This method includes the steps of: irradiating a substrate formed of a skived film of ultra-high molecular weight polyolefin with radiation; graft-polymerizing, onto the radiation-irradiated substrate, a monomer containing a site into which a functional group having anion conducting ability can be introduced and an unsaturated carbon-carbon bond so as to form a graft chain composed of the polymerized monomer; introducing the functional group having anion conducting ability into the site of the formed graft chain so as to form an anion exchange membrane; and disposing a catalyst layer on a surface of the formed anion exchange membrane.

Advantageous Effects of Invention

The MEA of the present invention has various superior properties for achieving an improvement in the performance of an anion exchange PEFC compared to conventional MEAs. According to the production method of the present invention, it is possible to produce the MEA of the present invention having these advantages.

DESCRIPTION OF EMBODIMENTS

A first aspect of the present disclosure provides a fuel cell membrane electrode assembly (MEA) including: an anion exchange membrane; and a catalyst layer disposed on a surface of the anion exchange membrane. In this fuel cell MEA, the anion exchange membrane is an anion-conducting polymer electrolyte membrane in which a graft chain having anion conducting ability is graft-polymerized on a substrate formed of a skived film of ultra-high molecular weight polyolefin.

A second aspect of the present disclosure provides the fuel cell MEA according to the first aspect, wherein the anion exchange membrane has a thickness of 80 µm or less in a dry state.

A third aspect of the present disclosure provides the fuel cell MEA according to the first or second aspect, wherein the graft chain has a quaternary ammonium group having a structure in which three alkyl groups each having two or more carbon atoms are bonded to a nitrogen atom.

A fourth aspect of the present disclosure provides the fuel cell MEA according to any one of the first to third aspects, wherein the graft chain is a polymer chain having a structural unit represented by the following formula (A):

(A)

where, in the formula (A), R is an alkyl group having 1 to 4 carbon atoms.

A fifth aspect of the present disclosure provides a fuel cell including a membrane electrode assembly (MEA) including an anion exchange membrane. In this fuel cell, the MEA is the fuel cell MEA according to any one of the first to fourth aspects.

A sixth aspect of the present disclosure provides a method for producing the fuel cell MEA according to any one of the first to fourth aspects, the method including the steps of: irradiating a substrate formed of a skived film of ultra-high molecular weight polyolefin with radiation; graft-polymerizing, onto the radiation-irradiated substrate, a monomer containing a site into which a functional group having anion conducting ability can be introduced and an unsaturated carbon-carbon bond so as to form a graft chain composed of the polymerized monomer; introducing the functional group having anion conducting ability into the site of the formed graft chain so as to form an anion exchange membrane; and disposing a catalyst layer on a surface of the formed anion exchange membrane.

A seventh aspect of the present disclosure provides the method for producing the fuel cell MEA according to the sixth aspect, wherein the substrate has a thickness of 50 μm or less.

An eighth aspect of the present disclosure provides the method for producing the fuel cell MEA according to the sixth or seventh aspect, wherein the monomer is halogenated alkylstyrene.

A ninth aspect of the present disclosure provides the method for producing the fuel cell MEA according to any one of the sixth to eighth aspects, wherein the functional group is a quaternary ammonium group having a structure in which three alkyl groups each having two or more carbon atoms are bonded to a nitrogen atom.

A tenth aspect of the present disclosure provides the method for producing the fuel cell MEA according to any one of the sixth to ninth aspects, wherein the graft chain into which the functional group has been introduced is a polymer chain having a structural unit represented by the following formula (A):

(A)

where, in the formula (A), R is an alkyl group having 1 to 4 carbon atoms.

(Membrane Electrode Assembly)

The fuel cell MEA of the present invention includes an anion exchange membrane and a catalyst layer disposed on the surface of the membrane.

The anion exchange membrane is an anion-conducting polymer electrolyte membrane in which a graft chain having anion conducting ability is graft-polymerized on a substrate formed of a skived film of an ultra-high molecular weight polyolefin film. In other words, this anion exchange membrane is a grafted polymer membrane including a skived film of ultra-high molecular weight polyolefin as a substrate (substrate film).

When attention is focused on an anion exchange membrane that is an ion exchange membrane of a fuel cell MEA, the alkali resistance, mechanical strength, dimensional stability, anionic conductivity, fuel barrier property, and water permeability of the anion exchange membrane are particularly important in order to achieve an improvement in the performance, such as power output and durability, of an anion exchange PEFC. The alkali resistance is important based on the fact that in an anion exchange PEFC, an ion exchange membrane is placed in a highly alkaline environment. When the alkali resistance of the anion exchange membrane is low, the durability of a PEFC including the MEA decreases. The mechanical strength and the dimensional stability influence the durability of the PEFC. When these properties are poor, the durability of the PEFC decreases. The anionic conductivity and the fuel barrier property influence the output characteristics of the PEFC. When these properties are poor, the power output of the PEFC decreases. As for the anionic conductivity and the fuel barrier property, a balance between them is also important. On the other hand, no attention has been given to the water permeability of an anion exchange membrane. This is because, although water is needed at a cathode (reduction electrode) on the principle of power generation in an anion exchange PEFC, it is simply considered that water can be supplied by an auxiliary device such as a humidifier. In other words, attention has been focused only on the anionic conductivity and the fuel barrier property of the anion exchange membrane. However, it is desirable to minimize auxiliary devices in an actual PEFC and for the operation thereof. If the water permeability of an anion exchange membrane is ensured and thereby it is possible to efficiently transport water produced at the anode (oxidation electrode) to the cathode, an improvement in the output characteristics of the PEFC, in particular, in the output characteristics per unit weight and per unit volume is achieved. The need for this water permeability is not derived from the perception of an anion exchange membrane as a mere ion exchange membrane, but derived only from the careful study of the use of an anion exchange membrane in an actual fuel cell MEA or a PEFC (in particular, a PEFC system).

The substrate of the anion exchange membrane in the MEA of the present invention is formed of an ultra-high molecular weight polyolefin film. Ultra-high molecular weight polyolefin has higher alkali resistance, mechanical strength and fuel barrier property (particularly alkaline fuel barrier property) than fluorine-containing polymers such as perfluoroalkyl vinyl ether copolymers (for example, "Nafion" (registered trademark)) which have been widely used as cation exchange membranes (typically proton exchange membranes) for cation type PEFCs and than ordinary polyolefins such as HDPE and LDPE disclosed in Patent Literature 1. For example, in the case where an ordinary polyolefin film is used as a substrate, due to its low softening point and low strength, the resulting anion exchange membrane is susceptible to swelling during operation of the PEFC, and therefore, the fuel barrier property of the anion exchange membrane is significantly lower than the case where an ultra-high molecular weight polyolefin film is used as a substrate. In addition, in the case where ultra-high molecular weight polyolefin is used as a substrate, the dimensional stability in graft polymerization is higher than that in the case of ordinary polyolefins such as HDPE and LDPE. These superior properties of ultra-high molecular weight polyolefin result from the specificity derived from its very high molecular weight, as can be seen from the fact that unlike ordinary polyolefins, ultra-high molecular weight polyolefin is treated as an engineering plastic. Furthermore, unlike fluorine-containing polymers, ultra-high molecular weight polyolefin has less environmental impact because it does not release halogens when discarded. From the viewpoint of the rate of monomer penetration, ultra-high molecular weight polyolefin is more suitable for forming grafted membranes than aromatic hydrocarbon polymers, and the use of ultra-high molecular weight polyolefin makes it possible to produce MEAs at lower cost.

In addition, the substrate of the anion exchange membrane in the MEA of the present invention is formed of a skived film of ultra-high molecular weight polyolefin. Thereby, high water permeability of the anion exchange membrane is obtained. Ultra-high molecular weight polyolefin films include not only skived films formed by skiving blocks of ultra-high molecular weight polyolefin but also other films formed by, for example, an inflation method. When any of these other films is used as a substrate, the water permeability as high as that obtained when a skived film is used as substrate cannot be obtained. Furthermore, higher anionic conductivity can be obtained when a skived film is used as a substrate. Presumably, this is because the state of crystals in the film significantly depends on the production method of the ultra-high molecular weight polyolefin film. In a skived film, minute crystals of ultra-high molecular weight polyolefin are randomly oriented. On the other hand, for example, in a film formed by the inflation method, crystals of ultra-high molecular weight polyolefin are deposited in layers stacked in the thickness direction of the film because a force corresponding to stretching is applied to the polyolefin during the formation of the film. The crystals deposited in layers stacked in the thickness direction of the substrate inhibit the permeation of water through the anion exchange membrane in the thickness direction thereof. In graft polymerization, graft components having anion conducting ability are introduced between the crystals. Therefore, in the substrate in which the crystals are deposited in layers stacked in the thickness direction of the substrate, as the graft polymerization proceeds, the graft components are introduced between the layers of the crystals and thus the substrate is swollen selectively in the thickness direction thereof. As a result, the thickness of the resulting anion exchange membrane increases, resulting in an increase in membrane resistance during operation (power generation) of the PEFC. It can be said that in the case of a film formed by the inflation method, crystals deposited in layers influence the fuel barrier property of an anion exchange membrane as well as the water permeability thereof, and the fuel barrier property is higher than in the case of a skived film. However, in view of the balance among the fuel barrier property, the membrane resistance, and the water permeability, which contributes to the actual output performance, an anion exchange membrane including a skived film as a substrate is superior.

Furthermore, the use of a skived film as a substrate in an anion exchange membrane makes it possible to reduce the thickness of the anion exchange membrane. This is attributed to the following factors. When a film is formed by skiving, the formed film can have a uniform thickness. In a film formed by the inflation method, crystals are deposited in layers stacked in the thickness direction of the film, and therefore the thickness of the film is easily increased by graft polymerization because graft components are introduced between the layers of the crystals. The thickness of the anion exchange membrane in the MEA of the present invention is, for example, 80 µm or less in a dry state, and it can be 60 µm or less, or even 40 µm or less in a dry state. The lower limit of the thickness of the anion exchange membrane is not particularly limited, and it is 15 µm, for example. As used herein, the dry state refers to a state in which an anion exchange membrane is left for at least 24 hours in a space whose temperature and humidity are controlled at 23° C. and 53% RH.

Whether an ultra-high molecular weight polyolefin film is a skived film or not can be determined from the difference in the crystal structure between a skived film and any other film. The crystal structure can be evaluated using, for example, a transmission electron microscope (TEM).

The molecular weight of ultra-high molecular weight polyolefin is, for example, 1000000 to 4000000 in terms of the weight average molecular weight. It is preferably 1500000 to 3500000, and more preferably 2000000 to 3000000. When the molecular weight is too high, it is difficult to form the polyolefin into a film. When the molecular weight is too low, it is difficult to obtain the above-mentioned advantageous properties.

The weight average molecular weight of ultra-high molecular weight polyolefin can be evaluated by gel permeation chromatography (GPC). For example, the GPC measurement can be performed on a solution obtained by dissolving a resin to be evaluated (which may be in the form of a film) in a solvent (for example, o-dichlorobenzene) by applying heat thereto, if necessary. When the solution is prepared, a portion of the resin may not be dissolved in some cases, depending on the molecular weight of the resin and whether the resin has been crosslinked or not. In such a case, the measurement result of the portion of the resin dissolved in the solvent is used as the weight average molecular weight of this resin. The value thus obtained is rounded to the nearest ten-thousand.

The ultra-high molecular weight polyolefin is, for example, ultra-high molecular weight polyethylene or ultra-high molecular weight polypropylene. A wide variety of skived films of different molecular weights, different thick- nesses, etc. are commercially available, and from the viewpoint of relative availability, ultra-high molecular weight polyethylene is preferred.

The graft chain having anion conducting ability is, for example, a graft chain formed in a method for producing an anion exchange membrane to be described later. More specifically, the graft chain is, for example, a polymer chain composed of a monomer (monomer A to be described later) containing a site into which a functional group having anion conducting ability can be introduced and an unsaturated carbon-carbon bond, and a functional group having anion conducting ability has been introduced into the site of the polymer chain. Specific examples of the monomer and the functional group are the same as the examples of the monomer and the functional group to be described later in the method for producing an anion exchange membrane.

An example of the graft chain is a polymer chain having a quaternary ammonium group. A quaternary ammonium group has high anion conducting ability. The quaternary ammonium group can be introduced into the graft chain, for example, by forming, as a graft chain, a polymer chain of the monomer A having a halogenated alkyl group and then performing quaternization treatment in which the halogenated alkyl group is reacted with an amine (tertiary amine). In this quaternization treatment, a nucleophilic substitution reaction as a halogen exchange reaction for alkylating the tertiary amine proceeds. Typically, the graft chain has a quaternary ammonium group in its side chain.

Preferably, the quaternary ammonium group has a structure in which three alkyl groups each having two or more carbon atoms are bonded to a nitrogen atom. In this case, not only the water permeation rate of the anion exchange membrane but also the self-diffusion coefficient of water contained in the membrane (contained water) increase. A high self-diffusion coefficient of water contained in an anion exchange membrane means a high mobility of water in the membrane. Therefore, combined with the high water permeation rate, it is possible to efficiently transport water produced at the anode to the cathode, resulting in a further improvement in the output characteristics of the PEFC.

In particular, the graft chain is preferably a polymer chain having a structural unit represented by the following formula (A). In the formula (A), R is an alkyl group having 1 to 4 carbon atoms. R is, for example, a methyl group, an ethyl group, a propyl group, or a butyl group, and a methyl group or an ethyl group is preferred. In this case, the self-diffusion coefficient of water contained in the anion exchange membrane is particularly high. The structural unit represented by the formula (A) can be formed, for example, by forming a graft chain of halogenated alkylstyrene as the monomer A and reacting a halogenated alkyl group in the graft chain with triethylamine (by performing quaternization treatment).

(A)

The counter ions of quaternary ammonium groups are not particularly limited. The counter ions are, for example, hydroxide ions ($OH^-$) or carbonate ions ($CO_3^{2-}$).

The MEA of the present invention includes a catalyst layer. The catalyst layer may be the same as a catalyst layer included in a known MEA for use in an anion exchange PEFC. Unlike a cation exchange PEFC, a catalyst is not necessarily a noble metal such as platinum (Pt). For example, nickel, cobalt, iron, silver, etc. can be used. The configuration of the catalyst layer, such as a specific catalyst contained therein, on the anode side of the MEA (anode catalyst layer) may be different from or the same as that on the cathode side (cathode catalyst layer).

Figure 1:
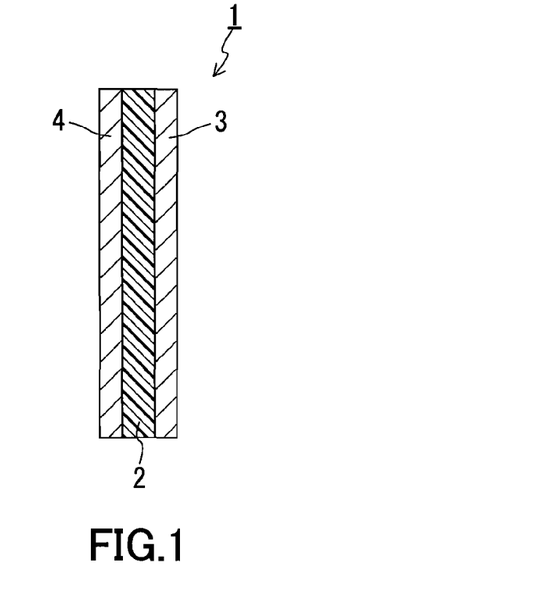
FIG. 1 is a cross-sectional view schematically showing an example of the MEA of the present invention.

In the MEA of the present invention, the catalyst layer is disposed on the surface of the anion exchange membrane. Typically, the anion exchange membrane and the catalyst layer are integrated together by a technique such as hot pressing. Usually, a pair of catalyst layers, that is, an anode catalyst layer and a cathode catalyst layer as the catalyst layers, are disposed respectively on the principal surfaces of the anion exchange membrane. FIG. 1 shows an example of the MEA of the present invention. A MEA 1 shown in FIG. 1 includes an anion exchange membrane 2, an anode catalyst layer 3, and a cathode catalyst layer 4. The anode catalyst layer 3 is disposed on one of the principal surfaces of the anion exchange membrane 2, and the cathode catalyst layer 4 is disposed on the other principal surface of the anion exchange membrane 2.

The MEA of the present invention can include any optional members in addition to the anion exchange membrane and the catalyst layers as long as the effects of the present invention can be obtained.

The MEA of the present invention can be produced, for example, by the method for producing the MEA described below.

(Method for Producing Membrane Electrode Assembly)

The method for producing the MEA of the present invention includes the steps of:

(i) irradiating a substrate (substrate film) formed of a skived film of ultra-high molecular weight polyolefin with radiation (irradiating step);

(ii) graft-polymerizing, onto the substrate that has been irradiated with radiation in the irradiating step, a monomer containing a site into which a functional group having anion conducting ability can be introduced and an unsaturated carbon-carbon bond so as to form a graft chain composed of the polymerized monomer (polymerizing step);

(iii) introducing the functional group having anion conducting ability into the site of the graft chain that has been formed in the polymerizing step so as to form an anion exchange membrane (introducing step); and (iv) disposing a catalyst layer on a surface of the anion exchange membrane that has been formed in the introducing step (disposing step). The MEA of the present invention can be obtained by this method.

In the irradiating step, a substrate formed of a skived film of ultra-high molecular weight polyolefin is irradiated with radiation. The ultra-high molecular weight polyolefin and the skived film thereof are as described above. The skived film of ultra-high molecular weight polyolefin can be formed, for example, by forming a block of ultra-high molecular weight polyolefin and then skiving the block. A specific way of forming the skived film can be a known method. A commercially available skived film may be used.

Skived films of ultra-high molecular weight polyolefin are a type of ultra-high molecular weight polyolefin films. However, they have a more uniform thickness and have more randomly oriented crystals (in other words, less anisotropically and more isotropically oriented crystals) than films formed by other methods such as an inflation method and films composed of ordinary polyolefins such as HDPE and LDPE. Therefore, when a skived film is used to form an anion exchange membrane or a MEA, the alkali resistance, mechanical strength, dimensional stability, and fuel barrier property of the membrane or the MEA can be ensured, although the film as a substrate is thinner. Furthermore, the thinner substrate also contributes to an improvement in the anionic conductivity and water permeability. The thickness of the substrate can be 50 μm or less, for example. From the viewpoints of the balance between the anionic conductivity and the fuel barrier property and of the water permeability, the thickness is also preferably 50 μm or less, and more preferably 30 μm or less. The lower limit of the thickness of the substrate is not particularly limited, but it is, for example, 10 μm. When the substrate is too thin, the strength of the anion exchange membrane or the MEA is insufficient, resulting in an increase in the risk of damaging the MEA during operation of the PEFC.

The substrate film to be irradiated with radiation may contain any other resin and/or low-molecular weight compound in addition to the ultra-high molecular weight polyolefin as long as the effects of the present invention can be obtained. The substrate film is formed of, for example, a skived film of ultra-high molecular weight polyolefin.

The irradiating step can be carried out in the same manner as the step of irradiating a substrate film with radiation in conventional radiation-induced graft polymerization.

The radiation used to irradiate the substrate in the irradiating step is, for example, ionizing radiation such as α rays, β rays, γ rays, electron beams, or ultraviolet rays, and γ rays or electron beams are preferred. The radiation dose is not particularly limited. The radiation dose is, for example, 1 kGy to 400 kGy, and preferably 10 kGy to 300 kGy. When the radiation dose is 1 kGy or more, it is possible to prevent the grafting ratio from decreasing too much in the subsequent polymerizing step. When the radiation dose is 400 kGy or less, it is possible to suppress the excessive polymerization reaction in the subsequent polymerizing step and deterioration of the substrate in the irradiating step.

After being irradiated with radiation, the substrate may be maintained at a low temperature (for example, at −30° C. or lower) until the next polymerizing step is performed.

In the polymerizing step, a monomer A containing a site into which a functional group having anion conducting ability can be introduced and an unsaturated carbon-carbon bond are graft-polymerized onto the substrate that has been irradiated with radiation in the irradiating step, so as to form a grafted membrane containing graft chains composed of the polymerized monomer A.

The monomer A is a monomer having polymerizability derived from an unsaturated carbon-carbon bond. The unsaturated carbon-carbon bond is, for example, a carbon-carbon double bond or a carbon-carbon triple bond, and it is typically a carbon-carbon double bond. The carbon-carbon double bond is, for example, a vinyl group, and in this case, the monomer A is a monomer having vinyl polymerizability. The monomer A may contain a benzene ring (such as a phenylene group) serving as a resonance structure to improve the polymerizability.

The monomer A contains a site into which a functional group having anion conducting ability can be introduced. Therefore, a graft chain formed by the polymerization of the monomer A contains a site into which a functional group having anion conducting ability can be introduced. Such a site is, for example, a halogenated alkyl group. A quaternary ammonium group, which is a functional group having anion conducting ability, can be formed by reacting a halogenated alkyl group with a tertiary amine (for example, trialkylamine).

The monomer A itself may have a functional group having anion conducting ability, and in this case, the introducing step can be omitted.

Preferably, the monomer A has a vinyl group as an unsaturated carbon-carbon bond, and a halogenated alkyl group as a site (molecular structure) into which a functional group having anion conducting ability can be introduced. In the case where the monomer A has a halogenated alkyl group, because of its high reactivity, a functional group having anion conducting ability can be introduced efficiently in the introducing step. In the case where the formed graft chains are crosslinked later (in the case where a crosslinked structure is introduced into the graft chains), the crosslinking reaction is allowed to proceed efficiently. Examples of the halogenated alkyl group include a halogenated methyl group, a halogenated ethyl group, a halogenated propyl group, and a halogenated butyl group. Examples of halogens contained in the halogenated alkyl group include chlorine, bromine, fluorine, and iodine.

Preferred specific examples of the monomer A is halogenated alkylstyrene. Examples of halogenated alkylstyrene include chloromethylstyrene, chloroethylstyrene, chloropropylstyrene, chlorobutylstyrene, bromomethylstyrene, bromoethylstyrene, bromopropylstyrene, bromobutylstyrene, iodomethylstyrene, iodoethylstyrene, iodopropylstyrene, and iodobutylstyrene. The positional relationship between the halogenated alkyl group and the unsaturated carbon-carbon bond (a vinyl group in this case) in the halogenated alkylstyrene is not particularly limited as long as the method for producing the MEA of the present invention can be carried out. They may be in the meta and/or para position, and for example, they are in the para position.

Other specific examples of the monomer A include halogenated alkyl vinyl ketone (X—R—C(=O)—CH=CH$_2$) and halogenated alkyl acrylamide (X—R—NH—C(=O)—CH=CH$_2$).

In the polymerizing step, one type of monomer A may be used alone, or two or more types of monomers A may be used. When two or more types of monomers A are used, graft chains as copolymer chains of these monomers A are formed.

The polymerizing step may be carried out in the same manner as the step of forming a graft chain through graft polymerization of a radiation-irradiated substrate film in conventional radiation-induced graft polymerization.

The polymerizing step is carried out, for example, in a solid-liquid two-phase system. More specifically, for example, graft polymerization is allowed to proceed by bringing the substrate (solid phase) that has been irradiated with radiation into contact with a solution (liquid phase) containing the monomer A. The contact is, for example, immersion of the substrate in the solution. It is preferable to carry out the graft polymerization in an atmosphere with the lowest possible oxygen concentration in order to prevent the reaction from being inhibited by the presence of oxygen. For this purpose, for example, the solution containing the monomer A may be bubbled with nitrogen gas or the like.

As a solvent used in the solution (polymerization liquid) containing the monomer A, any solvent in which the monomer A is soluble but the substrate is insoluble is selected. The solvent may be selected according to the solubility of the monomer A and the insolubility of the substrate. The solvent is not particularly limited. For example, aromatic compounds such as: aromatic hydrocarbons including benzene, toluene, and xylene; and phenols including phenol and cresol can be used. When an aromatic compound is used as the solvent, the grafting ratio tends to be higher. In addition, since a free polymer, as a by-product, which has not graft-polymerized on the substrate (i.e., which is separated from the substrate) is soluble in the aromatic compound, the solution can be kept homogeneous. The solvent may be a mixture of two or more solvents. In the case where the monomer A is a liquid at a temperature at which graft polymerization is to be carried out, the graft polymerization may be carried out without using a solvent.

The concentration of the monomer A in the solution can be determined according to the polymerizability of the monomer A and the target grafting ratio, but it is preferably 20 wt. % or more. When the concentration of the monomer A is 20 wt. % or more, the grafting reaction is allowed to proceed sufficiently.

It is preferable to carry out graft polymerization so that the weight (dry weight) of the substrate after the polymerizing step (i.e., the total of the weight of the substrate and the weight of the graft components) be about 1.4 to 2.3 times the weight (dry weight) of the substrate before the polymerizing step. When this ratio is too small, the graft components enough to form an anion exchange membrane may have not been introduced. When this ratio is too large, the strength of the formed anion exchange membrane and MEA decreases in some cases.

A specific example of the polymerizing step is as follows. A solution containing the monomer A is poured into a vessel of glass, stainless steel, or the like. Next, in order to remove dissolved oxygen, which inhibits the graft polymerization, the solution is degassed under reduced pressure and bubbled with an inert gas such as nitrogen gas. Next, the substrate, after being irradiated with radiation, is put into the solution to carry out graft polymerization. Through the graft polymerization, graft chains having structural units derived from the monomer A are attached to the ultra-high molecular weight polyolefin constituting the substrate. The duration of the graft polymerization is, for example, about 10 minutes to 12 hours. The reaction temperature is, for example, 0° C. to 100° C. (preferably 40° C. to 80° C.). Next, the substrate after graft polymerization is taken from the solution. Next, in order to remove the solvent, an unreacted monomer, and a free polymer separated from the substrate, the substrate taken from the solution is washed with an appropriate amount of dissolving agent (typically, washed 3 to 6 times), followed by drying. The dissolving agent is selected from dissolving agents in which the monomer and free polymer are soluble but the substrate after graft polymerization and graft chains are insoluble. For example, the dissolving agent is toluene or acetone.

In the introducing step, a functional group (anion exchange group) having anion conducting ability is introduced into a site which is contained in a graft chain and into which a functional group having anion conducting ability can be introduced. Thus, an anion exchange membrane is obtained. Typically, the anion exchange group is introduced into the side chain of the graft chain.

The introducing step can be carried out in the same manner as the step of introducing an anion exchange group in the production of a conventional anion exchange membrane as a grafted membrane.

For example, in the case where the site is a halogenated alkyl group, an anion exchange group (quaternary ammonium group) can be introduced into the graft chain by quaternization treatment through a reaction between the halogenated alkyl group and an amine (tertiary amine). Examples of the amine include: trialkylamines such as trimethylamine, triethylamine, and dimethylbutylamine; diamines such as ethylenediamine; and aromatic amines such as pyridine and imidazole. A preferred combination is a combination of chloromethylstyrene as the site and trimethylamine as the amine.

In the case where the functional group having anion conducting ability is a quaternary ammonium group, high anion conducting ability is ensured. Preferably, the quaternary ammonium group to be formed in the introducing step has a structure in which three alkyl groups each having two or more carbon atoms are bonded to a nitrogen atom. In this case, an anion exchange membrane having not only a high water permeation rate but also a high self-diffusion coefficient of water contained therein can be formed, and therefore, the output characteristics of the PEFC including this membrane is further improved.

In particular, it is preferable to perform the introducing step so as to obtain a polymer chain having a structural unit represented by the following formula (A) as the graft chain into which the functional group having anion conducting ability has been introduced. In the formula (A), R is an alkyl group having 1 to 4 carbon atoms. Such an alkyl group is, for example, a methyl group, an ethyl group, a propyl group, or a butyl group, and a methyl group or an ethyl group is preferred. In this case, the self-diffusion coefficient of water contained in the formed anion exchange membrane is particularly high. The graft chain as described above can be formed, for example, by forming a graft chain of halogenated alkylstyrene as the monomer A in the polymerizing step and then reacting a halogenated alkyl group in the graft chain with triethylamine (by performing quaternization treatment) in the introducing step.

(A)

The substrate that has undergone the introducing step may be washed with alcohol, acid, pure water, or the like, if necessary.

In the disposing step, a catalyst layer is disposed on the surface of the anion exchange membrane that has been formed through the introducing step. The disposing step can be carried out in the same manner as the step of disposing a catalyst layer on the surface of an ion exchange membrane in conventional MEA production methods. The catalyst layer to be disposed can be selected as appropriate from catalyst layers for conventional MEAs that can be used in anion exchange PEFCs.

The method for producing the MEA of the present invention can include any optional steps in addition to the above-mentioned steps as long as the MEA of the present invention can be produced. The optional steps are, for example, a step of crosslinking the substrate and a step of crosslinking graft chains. The substrate can be crosslinked, for example, by being irradiated with radiation and then being heated. These radiation irradiation and heating are carried out before the above-described irradiating step. Graft chains can be crosslinked, for example, by heating after the polymerizing step.

(Fuel Cell)

The fuel cell of the present invention is an anion exchange PEFC, and includes the MEA of the present invention. Thereby, an improvement in the performance of the anion exchange PEFC is achieved. For example, the high alkali resistance, mechanical strength and dimensional stability of the anion exchange membrane in the MEA result in the high durability of the PEFC. In addition, the high anionic conductivity, fuel barrier property and water permeability of the anion exchange membrane in the MEA as well as a good balance between the anionic conductivity and the fuel barrier property result in the high output characteristics of the PEFC. Furthermore, the high water permeability of the anion exchange membrane in the MEA leads to an increase in the efficiency (for example, an increase in the power output per unit weight and/or per unit volume) of not only a single fuel cell or a single fuel cell stack but also a fuel cell system including auxiliary devices. For example, a humidifier on the cathode side can be omitted.

Figure 2:
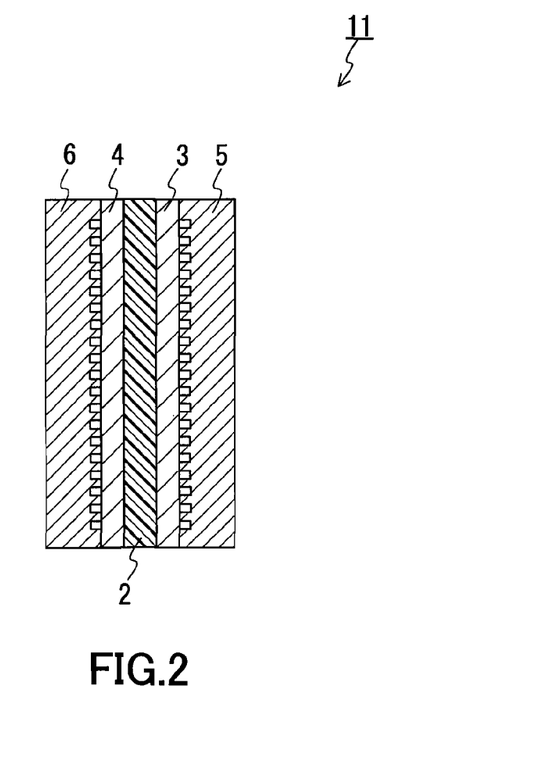
FIG. 2 is a cross-sectional view schematically showing an example of the fuel cell of the present invention.

FIG. 2 shows an example of the fuel cell of the present invention. A fuel cell 11 shown in FIG. 2 includes an anion exchange membrane 2, a pair of catalyst layers (the anode catalyst layer 3 and the cathode catalyst layer 4) disposed so as to sandwich the anion exchange membrane 2 therebetween, and a pair of separators (an anode separator 5 and a cathode separator 6) disposed so as to sandwich the pair of catalyst layers therebetween. These component members are integrated together under pressure applied in the direction perpendicular to the principal surface of each of the members. The anion exchange membrane 2 and the catalyst layers 3 and 4 constitute the MEA 1.

The fuel cell of the present invention is an anion exchange fuel cell, and in this fuel cell, a fuel is supplied to the anode and an oxidant is supplied to the cathode. Examples of the fuel are alkaline fuels including alcohol, hydrazine (hydrate), etc. Preferably, the fuel contains hydrazine (hydrate) because hydrazine is highly reactive and does not produce $CO_2$ on the principle of power generation. The oxidant is, for example, air.

The fuel cell of the present invention can include, in addition to the MEA of the present invention, a known member as a member constituting a PEFC. For example, the member is a gas diffusion layer, a separator, or the like, when the fuel cell is defined as a single cell, and the member is a fuel supplier, an oxidant supplier, a humidifier, a current collector, a temperature sensor, an oxygen sensor, a flowmeter, a humidity sensor, or the like for detecting the state of power generation, when the fuel cell is defined as a system.

EXAMPLES

Hereinafter, the present invention will be described in more detail by way of Examples. The present invention is not limited to the following Examples.

Ultra-high molecular weight polyethylene (UHMWPE) films shown below were prepared. However, only a film No. 6 was a HDPE film. The weight average molecular weight of UHMWPE or HDPE of each of the films is the value obtained by GPC measurement of the film as a measurement object. Specifically, for the measurement, a gel permeation chromatograph "Alliance GPC 2000" (manufactured by Waters) was used as a GPC measurement device. "TSKgel GMH6-HT" and "TSKgel GMH6-HTL" (both manufactured by Tosoh Corporation) were used as separation columns. A differential refractometer was used as a detector, the temperature of the columns was set to 140° C., and ortho-dichlorobenzene was used as a mobile phase. Monodisperse polystyrene manufactured by Tosoh Corporation was used to calibrate the molecular weights. Samples for GPC measurement were prepared by adding 20 mL of ortho-dichlorobenzene to 7.5 mg of each film as a measurement object, dissolving the film at 145° C., and then filtering the resulting mixture through a sintered filter with pores of 1 µm diameter.

[Film List]

Film No. 1: A skived film, "Newlight film #50W" manufactured by Saxin Corporation was used as a film No. 1. The thickness of the film No. 1 was 50 µm. The weight average molecular weight Mw was 1780000 when evaluated by the GPC measurement using this film as a measurement object.

Film No. 2: Ultra-high molecular weight polyethylene powder ("HI-ZEX MILLION 240M", manufactured by Mitsui Chemicals Inc.) was filled into a mold, and a pressure of 100 kg/cm$^2$ was applied to the mold at a temperature of 25° C. for 10 minutes to preform the powder. Next, the pressure was lowered to 30 kg/cm$^2$ and the temperature was raised to 210° C., and these pressure and temperature were maintained for 120 minutes to melt the ultra-high molecular weight polyethylene powder. Next, the pressure was increased to 100 kg/cm$^2$, and the temperature was lowered to room temperature over 120 minutes while the increased pressure was maintained. After the cooling, the resulting product was removed from the mold. Thus, a cylindrically formed body, that is, a sintered block, with an outer diameter of 80 mm, an inner diameter of 40 mm, and a length of 80 mm was obtained. Next, the formed body was skived to obtain a skived film with a thickness of 25 µm as a film No. 2. The weight average molecular weight Mw was 1540000 when evaluated by the GPC measurement using this film as a measurement object.

Film No. 3: The cylindrically formed body obtained in the production of the film No. 2 was skived to obtain a skived film with a thickness of 15 µm as a film No. 3. The weight average molecular weight Mw was 1540000 when evaluated by the GPC measurement using this film as a measurement object.

Film No. 4: The cylindrically formed body obtained in the production of the film No. 2 was skived to obtain a skived film with a thickness of 100 µm as a film No. 4. The weight average molecular weight Mw was 1540000 when evaluated by the GPC measurement using this film as a measurement object.

Film No. 5: A film produced by the inflation method, "Newlight Innovate ML501" manufactured by Saxin Corporation was used as a film No. 5. The thickness of the film No. 5 was 50 µm. The weight average molecular weight Mw was 1900000 when evaluated by the GPC measurement using this film as a measurement object. This film was in the stretched state corresponding to that of a biaxially stretched film. When this film was subjected to heat treatment at 140° C. for 60 minutes, the length in the MD direction, the length in the TD direction, and the area were changed to one fourth, one third, and one twelfth the original ones, respectively.

Film No. 6: A HDPE film, "HD" manufactured by Tamapoly Co., Ltd. was used as a film No. 6. The thickness of the film No. 6 was 50 µm. The weight average molecular weight Mw was 500000 when evaluated by the GPC measurement using this film as a measurement object.

Film No. 7: A film produced by the inflation method, "Newlight Innovate ML301" manufactured by Saxin Corporation was used as a film No. 7. The thickness of the film No. 7 was 30 µm. The weight average molecular weight Mw was 1900000 when evaluated by the GPC measurement using this film as a measurement. This film was in the stretched state corresponding to that of a biaxially stretched film. When this film was subjected to heat treatment at 140° C. for 60 minutes, the length in the MD direction, the length in the TD direction, and the area were changed to one fifth, one fourth, and one twentieth the original ones, respectively. This film contracted significantly by heat treatment. Presumably, this is because a force corresponding to stronger stretching had been applied to the film No. 7 than the film No. 5 during the production process, although both of these films were formed by the same inflation method.

Example 1

Production of Anion Exchange Membranes Using Film No. 1

The film No. 1 was irradiated with an electron beam in a nitrogen atmosphere. Irradiation with the electron beam was performed from one of the principal surfaces of the film No. 1 at an accelerating voltage of 250 kV and a radiation dose of 90 kGy. After the electron beam irradiation, the film No. 1 was cooled to dry ice temperature using dry ice and stored until the next polymerizing step was performed.

Next, 550 g of 4-(chloromethyl)styrene as a monomer A was prepared and bubbled with nitrogen gas to remove oxygen in the monomer solution. A solvent was not used because 4-(chloromethyl)styrene is liquid at ordinary temperature. Next, the electron beam irradiated film No. 1 was immersed in the monomer solution whose temperature was raised to 70° C. for a predetermined immersion time so as to allow graft polymerization to proceed. The time was set to 10 minutes, 15 minutes, 30 minutes, or 60 minutes. Next, the film No. 1 after the graft polymerization was taken from the solution, and immersed in toluene for at least one hour for washing and then further washed with acetone for 30 minutes. After the washing, the film No. 1 was dried in a drying oven at 80° C. Thus, grafted membranes were obtained. The grafting ratios of the grafted membranes thus obtained were 68%, 83%, 112%, and 131%, respectively, in ascending order of the immersion time. The grafting ratio was calculated by the following equation:

Grafting ratio={(Membrane weight after graft polymerization)−(Membrane weight before graft polymerization)}/(Membrane weight before graft polymerization)×100(%)

That is, the grafting ratio is the ratio of the weight of graft components introduced through graft polymerization to the weight of the substrate itself. It should be noted that the membrane weights are all those in the dry state. In Examples and Comparative Examples below, the grafting ratios were calculated in the same manner as described above.

Next, the grafted membrane was immersed in an ethanol solution of dimethylbutylamine (with a concentration of 30 wt. %, manufactured by Aldrich) at room temperature for 12 hours so as to perform quaternization treatment of chloromethyl groups of the graft chains and dimethylbutylamine. Next, the grafted membrane after the quaternization treatment was washed with ethanol for 30 minutes. Then, the grafted membrane was washed with an ethanol solution of HCl (with a concentration of 1 N) for 30 minutes and further washed with pure water. Then, the membrane was immersed in an aqueous solution of KOH with a concentration of 1 M for 2 hours to allow ion exchange to occur. The membrane was washed with pure water, and then bubbled with carbon dioxide for 30 minutes in pure water. Thus, anion exchange membranes having a carbonate ion-containing quaternary ammonium group were obtained. The membrane with a grafting ratio of 68%, the membrane with a grafting ratio of 83%, the membrane with a grafting ratio of 112%, and the membrane with a grafting ratio of 131% were used as Example 1-1, Example 1-2, Example 1-3, and Example 1-4, respectively.

Example 2

Production of Anion Exchange Membranes Using Film No. 2

Anion exchange membranes were produced in the same manner as in Example 1, except that the film No. 2 was used instead of the film No. 1 and that after being irradiated with the electron beam, the film was immersed in the monomer solution for 15 minutes, 30 minutes, or 60 minutes. The grafting ratios of the grafted membranes thus obtained were 62%, 82%, and 98%, respectively, in ascending order of the immersion time. The membrane with a grafting ratio of 62%, the membrane with a grafting ratio of 82%, and the membrane with a grafting ratio of 98% were used as Example 2-1, Example 2-2, and Example 2-3, respectively.

Aside from these membranes, an anion exchange membrane (Example 2-4) was produced in the same manner as in Example 1, except that the film No. 2 was used instead of the film No. 1, that after being irradiated with the electron beam, the film was immersed in the monomer solution for 60 minutes, and that quaternization treatment was performed using an ethanol solution of triethylamine (with a concentration of 30 wt. %, manufactured by Aldrich) instead of a dimethylbutylamine solution. The grafting ratio of the grafted membrane thus obtained was 98%.

Example 3

Production of Anion Exchange Membranes Using Film No. 3

Anion exchange membranes were produced in the same manner as in Example 1, except that the film No. 3 was used instead of the film No. 1 and that after being irradiated with the electron beam, the film was immersed in the monomer solution for 17 minutes, 33 minutes, or 66 minutes. The grafting ratios of the grafted membranes thus obtained were 61%, 82%, and 101%, respectively, in ascending order of the immersion time. The membrane with a grafting ratio of 61%, the membrane with a grafting ratio of 82%, and the membrane with a grafting ratio of 101% were used as Example 3-1, Example 3-2, and Example 3-3, respectively.

Example 4

Production of Anion Exchange Membranes Using Film No. 4

Anion exchange membranes were produced in the same manner as in Example 1, except that the film No. 4 was used instead of the film No. 1 and that after being irradiated with the electron beam, the film was immersed in the monomer solution for 30 minutes or 60 minutes. The grafting ratios of the grafted membranes thus obtained were 98% and 129%, respectively, in ascending order of the immersion time. The membrane with a grafting ratio of 98% and the membrane with a grafting ratio of 129% were used as Example 4-1 and Example 4-2, respectively.

Comparative Example 1

Production of Anion Exchange Membranes Using Film No. 5

Anion exchange membranes were produced in the same manner as in Example 1, except that the film No. 5 was used instead of the film No. 1 and that after being irradiated with the electron beam, the film was immersed in the monomer solution for 20 minutes, 60 minutes, or 330 minutes. The grafting ratios of the grafted membranes thus obtained were 89%, 124%, and 150%, respectively, in ascending order of the immersion time. The membrane with a grafting ratio of 89%, the membrane with a grafting ratio of 124%, and the membrane with a grafting ratio of 150% were used as Comparative Example 1-1, Comparative Example 1-2, and Comparative Example 1-3, respectively.

Comparative Example 2

Production of Anion Exchange Membranes Using Film No. 6

Anion exchange membranes were produced in the same manner as in Example 1, except that the film No. 6 was used instead of the film No. 1 and that after being irradiated with the electron beam, the film was immersed in the monomer solution for 17 minutes or 60 minutes. The grafting ratios of the grafted membranes thus obtained were 62% and 82%, respectively, in ascending order of the immersion time. The membrane with a grafting ratio of 62% and the membrane with a grafting ratio of 82% were used as Comparative Example 2-1 and Comparative Example 2-2, respectively.

Comparative Example 3

Production of Anion Exchange Membranes Using Film No. 7

Anion exchange membranes were produced in the same manner as in Example 1, except that the film No. 7 was used instead of the film No. 1 and that after being irradiated with the electron beam, the film was immersed in the monomer solution for 20 minutes or 60 minutes. The grafting ratios of the grafted membranes thus obtained were 72% and 116%, respectively, in ascending order of the immersion time. The membrane with a grafting ratio of 72% and the membrane with a grafting ratio of 116% were used as Comparative Example 3-1 and Comparative Example 3-2, respectively.

The anion exchange membranes produced as Examples and Comparative Examples are collectively shown in Table 1 below.

TABLE 1

| | Resin constituting substrate (Mw in parentheses) | Thickness of substrate (μm) | Grafting ratio (%) | Thickness of anion exchange membrane (μm) |
|---|---|---|---|---|
| Example 1-1 | UHMWPE | 50 | 68 | 67 |
| Example 1-2 | (1780000) | | 83 | 71 |
| Example 1-3 | | | 112 | 74 |
| Example 1-4 | | | 131 | 76 |
| Example 2-1 | UHMWPE | 25 | 62 | 32 |
| Example 2-2 | (1540000) | | 82 | 33 |
| Example 2-3 | | | 98 | 35 |
| Example 2-4 | | | 98 | 35 |
| Example 3-1 | UHMWPE | 15 | 61 | 20 |
| Example 3-2 | (1540000) | | 82 | 22 |
| Example 3-3 | | | 101 | 22 |
| Example 4-1 | UHMWPE | 100 | 98 | 145 |
| Example 4-2 | (1540000) | | 129 | 153 |
| Com. Example 1-1 | UHMWPE | 50 | 89 | 113 |
| Com. Example 1-2 | (1900000) | | 124 | 149 |
| Com. Example 1-3 | | | 150 | 162 |
| Com. Example 2-1 | HDPE | 50 | 62 | 65 |
| Com. Example 2-2 | (500000) | | 82 | 66 |
| Com. Example 3-1 | UHMWPE | 30 | 72 | 70 |
| Com. Example 3-2 | (1900000) | | 116 | 87 |

As shown in Table 1, in Examples 1 to 4 in which skived films of ultra-high molecular weight polyethylene were used as substrates, the increase in the thicknesses of the substrates by graft polymerization was reduced and thus thinner anion exchange membranes could be formed, compared with Comparative Examples 1 and 3 in which inflation films of ultra-high molecular weight polyethylene were used as substrates. Thinner anion exchange membranes are desired to achieve a low resistance (i.e., a high anionic conductivity per thickness).

Examples 1 to 4 were compared. In Examples 1 to 3 in which the thicknesses of the substrates were 50 μm or less, the increase in the thicknesses of the substrates by graft polymerization was particularly reduced, compared with Example 4 in which the thickness of the substrate was more than 50 μm. It was confirmed that the thickness of a substrate is preferably 50 μm or less to obtain a low-resistance anion exchange membrane.

The evaluation methods and evaluation results of each film as a substrate are described.

[Differential Scanning Calorimetry (DSC)]

Figure 3:
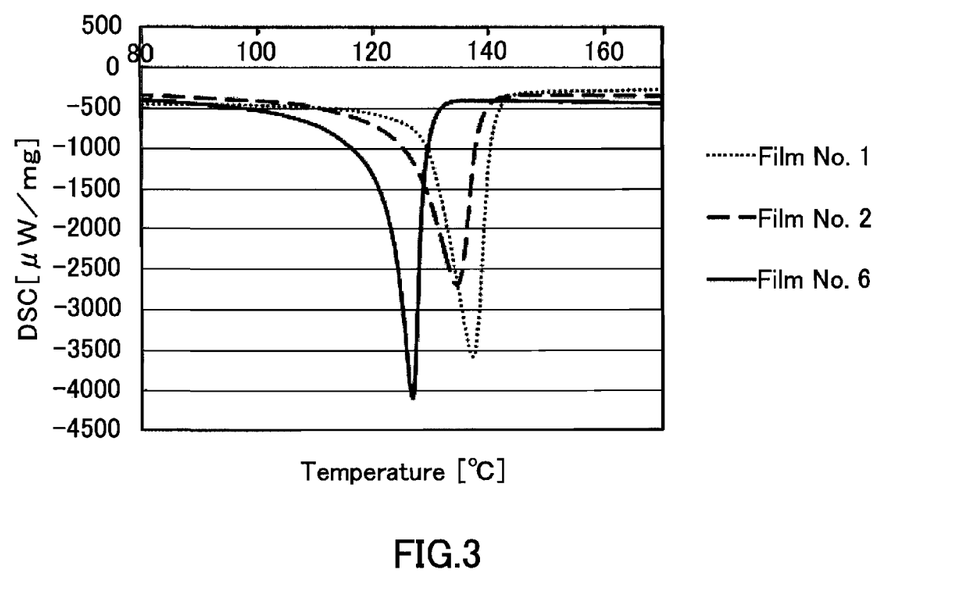
FIG. 3 is a diagram showing the results of differential scanning calorimetry (DSC) of anion exchange membranes produced in Examples.

Differential scanning calorimetry (DSC) was performed on each of the films No. 1, No. 2, and No. 6 as substrates in the following manner. Each substrate film was punched into a piece with a diameter of 2 mm and the piece was placed in a measuring aluminum cell so that the weight of the sample cell was about 10 mg. Then, the measurement was performed using DSC 200 F3 manufactured by NETZSCH at a temperature rise rate of 10° C./min from room temperature to 200° C. FIG. 3 shows the measurement results. As shown in FIG. 3, the films No. 1 and No. 2 composed of ultra-high molecular weight polyethylene exhibited endothermic peaks corresponding to their softening at higher temperatures than the film No. 6 composed of HDPE, and thus it was confirmed that the films No. 1 and No. 2 have higher heat resistance.

[Mechanical Strength (Tensile Test)]

The mechanical strength (maximum tensile strength) of the films No. 1, No. 2, No. 3, No. 5, and No. 6 as substrates were obtained in the following manner. First, each film as a substrate was cut into a piece of 1 cm (MD direction)×8 cm (TD direction) to obtain a specimen. Next, the obtained specimen was placed in an autograph manufactured by SHIMADZU CORPORATION and a tensile test was carried out under the following conditions: a distance between chucks of 2 cm; a temperature of 25° C.; and a tensile speed of 20 cm/min. The tensile test was carried out until the specimen was broken, and the maximum strength obtained from the start of the test to the breakage was used as the maximum tensile strength. The tensile test was carried out in the MD direction and in the TD direction, respectively. Table 2 below shows the evaluation results.

TABLE 2

| Substrate film | Thickness (μm) | Maximum tensile strength (MPa) | |
| --- | --- | --- | --- |
| | | MD | TD |
| Film No. 1 | 50 | 74 | 55 |
| Film No. 2 | 25 | 43 | 37 |
| Film No. 3 | 15 | 45 | 39 |
| Film No. 5 | 50 | 156 | 195 |
| Film No. 6 | 50 | 56 | 40 |

As shown in Table 2, the substrates (films No. 1, No. 2, No. 3, and No. 5) composed of ultra-high molecular weight polyethylene exhibited high strength comparable to that of the substrate (film No. 6) composed of HDPE, even when the substrates were thin films. In the film No. 5 formed by the inflation method, the in-plane strength tends to be increased because a force corresponding to stretching was applied to the film in its formation process and thus the orientation of the crystalline components of the polyethylene in the in-plane direction was promoted.

The methods for evaluating the properties of the anion exchange membranes produced as Examples and Comparative Examples are described.

[Ionic Conductivity (Anionic Conductivity)]

First, each of the produced anion exchange membranes was cut into a piece of 20 mm×30 mm to obtain a specimen, and this specimen was immersed in water at 30° C. for at least 2 hours and swollen. Next, the specimen was immersed in water at 60° C. for 5 minutes, and a pair of platinum foil electrodes (with a width of 10 mm) were placed on one principal surface of the swollen membrane to obtain a measuring cell. The two platinum foil electrodes were placed on the principal surface, with a distance of 10 mm between them.

Next, the measuring cell was put into water at 60° C., and the impedance between the platinum foil electrodes was measured using an LCR meter. The measurement was performed at frequencies ranging from 10 kHz to 1 MHz. The real part of the impedance thus obtained was plotted on the horizontal axis and the imaginary part thereof was plotted on the vertical axis, and the value of the real part of the minimum impedance was defined as a membrane resistance R (Ω). The ionic conductivity σ [S/cm] of the anion exchange membrane was calculated by the following equation (1):

$$(\text{Ionic conductivity } \sigma) = L/(R \times t \times h \times 10^{-4}) [S/cm] \quad (1)$$

where t [μm] is the thickness of the swollen specimen, h [cm] is the width of the specimen, L [cm] is the distance between the platinum foil electrodes placed.

Next, the value of the ionic conductivity σ thus obtained was divided by the thickness t of each specimen so as to obtain the conductance $C = \sigma/(t \times 10^{-4})$ [S/cm$^2$] indicating the thickness-adjusted ionic conductivity.

[Fuel Permeability]

First, each of the produced anion exchange membrane was cut into a piece of 50 mm×50 mm to obtain a specimen, and this specimen was immersed in an aqueous solution of KOH with a concentration of 1 M for at least 12 hours. Next, the immersed specimen was interposed between two T-shaped cells and the cells were connected together to form an H shaped cell unit, with the specimen located in the center of the crossbar of the H shape. The area of the anion exchange membrane in the connecting portion between the cells was 7.07 cm$^2$. Next, 180 mL of water was poured into one of the cells that faced each other with the anion exchange membrane interposed therebetween and 180 mL of fuel (an aqueous solution of 10 wt. % hydrazine hydrate and 4.19 wt. % KOH) was poured into the other cell. Then, the cells were quickly placed in a water bath at 30° C. and the solutions in the cells were stirred. 2 mL of the solution in the cell containing water was sampled at regular intervals from the start of the stirring as the reference time. At the same time, 2 mL of the solution in the cell containing the fuel was also sampled so that the liquid level in one cell is kept equal to that in the other cell to prevent the pressure difference caused by the difference in the liquid level and thereby suppress the fluctuations and variations in the amount of the fuel that had passed through the membrane. The solution sampled from the cell containing water was diluted, and the diluted solution was titrated with an aqueous solution of hydrochloric acid with a concentration of 0.05 N using an automatic potentiometric titrator (AT-510, Kyoto Electronics Manufacturing Co., Ltd.) so as to obtain the content of hydrazine in this solution. The amount of hydrazine that had passed through the anion exchange membrane was calculated from the content thus obtained. Then, the hydrazine permeability coefficient T [mmol/(m·hr)] of the anion exchange membrane was calculated from a change in the amount of hydrazine that had passed through the membrane per unit membrane area and per unit time. The amount of hydrazine that had passed through the membrane was calculated from the temporal change in the content of hydrazine observed at regular intervals by the above-described technique (i.e., from the gradient of a graph with the time elapsed from the reference time to the sampling time of each solution on the horizontal axis and with the hydrazine content at the sampling time of the solution on the vertical axis).

[Water Permeability (Water Permeation Rate)]

First, each of the produced anion exchange membranes was cut into a piece of 50 mm×50 mm to obtain a specimen. Next, a 1-mm-thick silicone rubber sheet having an opening of 20 mm×20 mm was placed on each of the surfaces of the obtained specimen. Then, instead of a MEA, the specimen was incorporated into a commercially available cell for fuel cell evaluation. The silicone rubber sheet serves as a seal for preventing a gas or a liquid supplied to the specimen in the cell from leaking through the gap between the specimen (anion exchange membrane) and a member for supplying the gas or the liquid. The evaluation cell is configured to supply a gas or a liquid to a region where a specimen is placed in the cell and to discharge the gas or the liquid from the region where the specimen is placed. That is, the evaluation cell is configured in the same manner as an actual cell of a fuel cell that is configured to supply a fuel and an oxidant to a MEA and to discharge the unused fuel and oxidant as well as substances such as generated water therefrom.

Next, pure water was continuously supplied to one surface (pure water supply surface) of the specimen and dry air was continuously supplied to the other surface (air supply surface) thereof, with the cell including the specimen being maintained at 30° C. The amount of water that had moved from the pure water supply surface of the specimen to the air supply surface thereof (that has moved to the dry air side through the specimen) during a certain period of time after this supply state was stabilized was obtained by subtracting the amount of water discharged from the pure water supply surface (the amount of pure water discharged) from the amount of water supplied to the pure water supply surface (the amount of pure water supplied). Then, the water permeation rate [mol/(cm²·min)] of the anion exchange membrane per unit area and per unit time was obtained by the following formula (2) from the amounts of the water obtained, the area of the opening of the silicone rubber sheet corresponding to the contact area of the specimen with the pure water and dry air, and the certain period of time (elapsed time).

(Water Permeation Rate)={(Amount of Pure Water Supplied[g]−Amount of Pure Water Discharged [g])/Molecular Weight of Water}/(Area of Opening[$cm^2$]×Elapsed Time[min])     (2)

[Self-Diffusion Coefficient of Contained Water]

The self-diffusion coefficient of water contained in the anion exchange membrane was obtained in the following manner. First, each of the produced anion exchange membranes was punched into a circular piece with a diameter of 3 mm and 60 of these pieces were stacked on one another to obtain a specimen. Next, the obtained specimen and each of aqueous saturated inorganic salt solutions for controlling the humidity of the specimen were placed in a nuclear magnetic resonance (NMR) test tube, and the humidity of the specimen was controlled at the relative humidity determined for each selected aqueous saturated inorganic salt solution. As the aqueous saturated inorganic salt solutions, an aqueous saturated magnesium chloride solution, an aqueous saturated sodium bromide solution, and an aqueous saturated potassium chloride solution were prepared. The relative humidities of 26.1%, 51.4%, and 78.9% respectively are obtained using these aqueous solutions at 80° C. at which the NMR measurement is performed.

Each humidity-controlled specimen thus prepared in the NMR test tube was subjected to pulsed field gradient NMR measurement at a measurement temperature of 80° C. Thus, the self-diffusion coefficient of water contained in the specimen in its thickness direction was obtained. $^1H$ was used as an observed species for the NMR measurement. A nuclear magnetic resonance apparatus "AVANCE III 400 MB" manufactured by Bruker Biospin was used as a measuring apparatus. For the measurement, the stimulated echo measurement technique was used.

For each of the anion exchange membranes produced in Examples and Comparative Examples, the evaluation results of the anionic conductivity (conductance C) and the hydrazine permeability coefficient T are shown in Table 3 below.

TABLE 3

| | Conductance C (S/cm²) | Hydrazine permeability coefficient T (mmol/(m · hr)) |
|---|---|---|
| Example 1-1 | 1.7 | 0.359 |
| Example 1-2 | 2.2 | 0.449 |
| Example 1-3 | 2.4 | 0.598 |
| Example 1-4 | 2.2 | 0.654 |
| Example 2-1 | 5.2 | 0.389 |
| Example 2-2 | 7.2 | 0.416 |
| Example 2-3 | 6.5 | 0.576 |

TABLE 3-continued

| | Conductance C (S/cm²) | Hydrazine permeability coefficient T (mmol/(m · hr)) |
|---|---|---|
| Example 2-4 | 7.0 | 0.542 |
| Example 3-1 | 7.8 | 0.415 |
| Example 3-2 | 8.9 | 0.369 |
| Example 3-3 | 9.7 | 0.645 |
| Example 4-1 | 1.0 | 0.394 |
| Example 4-2 | 1.1 | 0.518 |
| Com. Example 1-1 | 1.1 | 0.212 |
| Com. Example 1-2 | 1.1 | 0.367 |
| Com. Example 1-3 | 1.0 | 0.410 |
| Com. Example 2-1 | 2.0 | 0.662 |
| Com. Example 2-2 | 2.9 | 0.880 |
| Com. Example 3-1 | 1.7 | 0.189 |
| Com. Example 3-2 | 1.9 | 0.313 |

As shown in Table 3, the hydrazine permeability coefficients T of Examples were lower than those of Comparative Examples 2-1 and 2-2 in which the substrate was composed of HDPE. This difference is clearly seen by comparing the conductance C per hydrazine permeability coefficient T.

On the other hand, the hydrazine permeability coefficients T of Comparative Examples 3-1 and 3-2 tend to be low, and for example, they are lower than that of Example 1-1 having a comparable level of conductance C. Presumably, this is because a force corresponding to stronger stretching is applied to the substrate in its formation process and thus the crystal structure of the polyethylene is strongly oriented in the in-plane direction of the substrate film. Judging only from the results shown in Table 3, it is inferred that even in the case where an inflation film (which is in the state corresponding to a biaxially stretched film) is used as a substrate like Comparative Examples 3-1 and 3-2, both low resistance and low fuel permeation can be achieved. However, the water permeability of the anion exchange membrane also is an important factor for the power generation performance of a fuel cell.

For each of Examples 1-2, 2-2, 3-2, 4-1 and Comparative Examples 1-1, 2-2, 3-1, and 3-2, the evaluation results of the anionic conductivity (conductance C), the hydrazine permeability coefficient T, and the water permeation rate are shown in Table 4 below.

TABLE 4

| | Conductance C (S/cm2) | Hydrazine permeability coefficient T (mmol/(m · hr)) | Water permeation rate (mol/(cm² · min)) |
|---|---|---|---|
| Example 1-2 | 2.2 | 0.449 | $2.27 \times 10^{-4}$ |
| Example 2-2 | 7.2 | 0.416 | $1.95 \times 10^{-4}$ |
| Example 3-2 | 8.9 | 0.369 | $2.86 \times 10^{-4}$ |
| Example 4-1 | 1.0 | 0.394 | $1.33 \times 10^{-4}$ |
| Com. Example 1-1 | 1.1 | 0.212 | $0.95 \times 10^{-4}$ |
| Com. Example 2-2 | 2.9 | 0.880 | $2.50 \times 10^{-4}$ |
| Com. Example 3-1 | 1.7 | 0.189 | $0.00 \times 10^{-4}$ |
| Com. Example 3-2 | 1.9 | 0.313 | $1.71 \times 10^{-4}$ |

As shown in Table 4, when the membranes having comparable conductances C were compared, the hydrazine permeability coefficients T of Comparative Examples 1-1, 3-1, and 3-2 in which inflation films were used as substrates tended to be lower than those of Comparative Example 2-2 in which a HDPE film was used as a substrate and Examples in which skived films were used as substrates. However, at the same time, the water permeation rates of these Comparative Examples 1-1, 3-1, and 3-2 were significantly lower than those of Examples. The water permeability of an anion exchange membrane has significant influence on the output characteristics of a fuel cell, and it is desired that the water permeability (water permeation rate) of the membrane be higher. Judging from the high balance among the conductance C, the hydrazine permeability coefficient T, and the water permeation rate, the membranes of Examples were much better than those of Comparative Examples.

Next, for each of the membranes of Examples 2-3 and 2-4 which differ from each other only in the amine used for quaternization treatment, the evaluation results of the anionic conductivity (conductance C) and the hydrazine permeability coefficient T are shown in Table 5 below, and the evaluation result of the self-diffusion coefficient of contained water obtained by pulsed field gradient NMR measurement is shown in Table 6 below.

TABLE 5

| | Amine used in quaternization treatment | Conductance C (S/cm$^2$) | Hydrazine permeability coefficient T (mmol/(m · hr)) |
|---|---|---|---|
| Example 2-3 | dimethylbutylamine | 6.5 | 0.576 |
| Example 2-4 | triethylamine | 7.0 | 0.542 |

TABLE 6

| | Relative humidity (%) | Self-diffusion coefficient (m$^2$/s) |
|---|---|---|
| Example 2-3 | 26.1 | 4.23 × 10$^{-11}$ |
| | 51.4 | 1.13 × 10$^{-10}$ |
| | 78.9 | 3.60 × 10$^{-10}$ |
| Example 2-4 | 26.1 | 6.19 × 10$^{-11}$ |
| | 51.4 | 1.58 × 10$^{-10}$ |
| | 78.9 | 5.09 × 10$^{-10}$ |

As shown in Tables 5 and 6, the conductance C and the hydrazine permeability coefficient T did not significantly vary according to the type of amine used for quaternization treatment. On the other hand, the self-diffusion coefficient of water in the membrane of Example 2-4 in which triethylamine was used was higher by about 1.4 times than that in the membrane of Example 2-3 in which dimethylbutylamine was used, in a wide range of relative humidities. High self-diffusion of water in an anion exchange membrane means that water can be transported more efficiently to a cathode that needs water under the power generation conditions of a fuel cell. Therefore, it was confirmed that a better anion exchange membrane can be obtained by the use of triethylamine for quaternization treatment. In the anion exchange membrane of Example 2-4 in which triethylamine was used for quaternization treatment, the graft chain has a structural unit represented by the above formula (A) (where R is a methyl group).

INDUSTRIAL APPLICABILITY

The MEA of the present invention can be used as a MEA in an anion exchange PEFC.

The present invention is applicable to other embodiments as long as they do not depart from the spirit or essential characteristics thereof. The embodiments disclosed in this description are to be considered in all respects as illustrative and not limiting. The scope of the invention is indicated by the appended claims rather than by the foregoing description, and all changes which come within the meaning and range of equivalency of the claims are intended to be embraced therein.

The invention claimed is:

1. A fuel cell membrane electrode assembly comprising: an anion exchange membrane; and a catalyst layer disposed on a surface of the anion exchange membrane, wherein
the anion exchange membrane is an anion-conducting polymer electrolyte membrane in which a graft chain having anion conducting ability is graft-polymerized on a substrate formed of a skived film of ultra-high molecular weight polyolefin having a molecular weight of 1000000 to 4000000 in terms of weight average molecular weight, and
the graft chain is introduced between crystals of the ultra-high molecular weight polyolefin present in the substrate formed of the skived film.

2. The fuel cell membrane electrode assembly according to claim 1, wherein the anion exchange membrane has a thickness of 80 μm or less in a dry state.

3. The fuel cell membrane electrode assembly according to claim 1, wherein the graft chain has a quaternary ammonium group having a structure in which three alkyl groups each having two or more carbon atoms are bonded to a nitrogen atom.

4. The fuel cell membrane electrode assembly according to claim 1, wherein the graft chain is a polymer chain having a structural unit represented by the following formula (A):

(A)

where, in the formula (A), R is an alkyl group having 1 to 4 carbon atoms.

5. A fuel cell comprising a membrane electrode assembly including an anion exchange membrane, wherein
the membrane electrode assembly is the fuel cell membrane electrode assembly according to claim 1.

6. A method for producing the fuel cell membrane electrode assembly according to claim 1, the method comprising the steps of:
irradiating a substrate formed of a skived film of ultra-high molecular weight polyolefin having a molecular weight of 1000000 to 4000000 in terms of weight average molecular weight with radiation;
graft-polymerizing, onto the radiation-irradiated substrate, a monomer containing a site into which a functional group having anion conducting ability can be introduced and an unsaturated carbon-carbon bond so as to form a graft chain composed of the polymerized monomer, introduced between crystals of the ultra-high molecular weight polyolefin present in the substrate formed of the skived film;
introducing the functional group having anion conducting ability into the site of the formed graft chain so as to form an anion exchange membrane; and disposing a catalyst layer on a surface of the formed anion exchange membrane.

7. The method for producing the fuel cell membrane electrode assembly according to claim 6, wherein the substrate has a thickness of 50 μm or less.

8. The method for producing the fuel cell membrane electrode assembly according to claim 6, wherein the monomer is halogenated alkylstyrene.

9. The method for producing the fuel cell membrane electrode assembly according to claim 6, wherein the functional group is a quaternary ammonium group having a structure in which three alkyl groups each having two or more carbon atoms are bonded to a nitrogen atom.

10. The method for producing the fuel cell membrane electrode assembly according to claim 6, wherein the graft chain into which the functional group has been introduced is a polymer chain having a structural unit represented by the following formula (A):

where, in the formula (A), R is an alkyl group having 1 to 4 carbon atoms.

11. The fuel cell membrane electrode assembly according to claim 1, wherein the graft chain penetrates into interfaces of the crystals of the ultra-high molecular weight polyolefin.

12. The fuel cell membrane electrode assembly according to claim 1, wherein the crystals of the ultra-high molecular weight polyolefin included in the substrate are randomly oriented.

13. The fuel cell membrane electrode assembly according to claim 1, wherein the crystals of the ultra-high molecular weight polyolefin included in the substrate are isotropically oriented.

14. The fuel cell membrane electrode assembly according to claim 1, wherein the anion exchange membrane has a hydrazine permeability coefficient of 0.576 or less (mmol/(m·hr)), and water permeation rate of $1.33 \times 10^{-4}$ or more (mol/(cm$^2$·min)).

15. The fuel cell membrane electrode assembly according to claim 1, wherein the anion exchange membrane has a self-diffusion coefficient of contained water of $4.23 \times 10^{-11}$ or more (m$^2$/s) at a temperature of 80° C. and a relative humidity of 26.1%.

16. The method for producing the fuel cell membrane electrode assembly according to claim 6, wherein, in the step of graft-polymerizing, the monomer penetrates into interfaces of the crystals of the ultra-high molecular weight polyolefin and is graft-polymerized so as to form the graft chain at the interfaces of the crystals.

17. The method for producing the fuel cell membrane electrode assembly according to claim 6, wherein the crystals of the ultra-high molecular weight polyolefin are randomly oriented.

18. The method for producing the fuel cell membrane electrode assembly according to claim 6, wherein the crystals of the ultra-high molecular weight polyolefin are isotropically oriented.

* * * * *